(12) United States Patent
Marinier

(10) Patent No.: US 7,096,042 B2
(45) Date of Patent: Aug. 22, 2006

(54) SYSTEM AND METHOD FOR INCREASING CELLULAR SYSTEM CAPACITY BY THE USE OF THE SAME FREQUENCY AND TIME SLOT FOR BOTH UPLINK AND DOWNLINK TRANSMISSIONS

(75) Inventor: Paul Marinier, Brossard (CA)

(73) Assignee: InterDigital Technology Corporation, Wilmington, DE (US)

( * ) Notice: Subject to any disclaimer, the term of this patent is extended or adjusted under 35 U.S.C. 154(b) by 57 days.

(21) Appl. No.: 10/624,812

(22) Filed: Jul. 22, 2003

(65) Prior Publication Data

US 2004/0142700 A1  Jul. 22, 2004

Related U.S. Application Data

(60) Provisional application No. 60/441,713, filed on Jan. 21, 2003.

(51) Int. Cl.
*H04Q 7/20* (2006.01)

(52) U.S. Cl. ........... 455/562.1; 455/24; 455/63.1; 455/69; 375/346; 370/279

(58) Field of Classification Search ........... 455/450, 455/453, 464, 509, 562.1, 24, 278.1, 63.1, 455/69; 370/278, 328–347
See application file for complete search history.

(56) References Cited

U.S. PATENT DOCUMENTS

| | | | |
|---|---|---|---|
| 4,991,165 A * | 2/1991 | Cronyn ................. 370/278 |
| 5,691,978 A * | 11/1997 | Kenworthy ............. 370/278 |
| 6,011,952 A * | 1/2000 | Dankberg et al. ......... 455/24 |
| 6,233,229 B1 * | 5/2001 | Ranta et al. ............ 370/330 |
| 6,243,399 B1 | 6/2001 | Kaewell et al. |
| 6,266,330 B1 * | 7/2001 | Jokinen et al. .......... 370/337 |
| 6,411,609 B1 * | 6/2002 | Emmons et al. .......... 370/321 |
| 6,504,837 B1 * | 1/2003 | Menzel ................ 370/337 |
| 6,519,240 B1 * | 2/2003 | Dillinger et al. ......... 370/337 |
| 6,556,845 B1 * | 4/2003 | Ide et al. .............. 455/562.1 |
| 6,810,019 B1 * | 10/2004 | Steudle ................ 370/252 |
| 6,947,408 B1 * | 9/2005 | Liberti et al. ........... 370/345 |
| 2001/0048691 A1 * | 12/2001 | Chang et al. ........... 370/442 |
| 2002/0122393 A1 * | 9/2002 | Caldwell et al. ......... 370/328 |
| 2003/0002449 A1 * | 1/2003 | Rittle et al. ............ 370/329 |
| 2003/0031279 A1 * | 2/2003 | Blount et al. ........... 375/346 |
| 2003/0104787 A1 * | 6/2003 | Blount et al. ........... 455/67.3 |
| 2003/0148744 A1 * | 8/2003 | Ide et al. .............. 455/67.1 |
| 2003/0185285 A1 * | 10/2003 | Talwar ................. 375/148 |
| 2003/0189949 A1 * | 10/2003 | Belaiche ............... 370/462 |
| 2004/0002357 A1 * | 1/2004 | Benveniste ............ 455/550.1 |
| 2004/0067774 A1 * | 4/2004 | Masaoka et al. .......... 455/561 |
| 2004/0092232 A1 * | 5/2004 | Zeira et al. ............ 455/67.11 |
| 2004/0097189 A1 * | 5/2004 | Bongfeldt et al. .......... 455/7 |

FOREIGN PATENT DOCUMENTS

| EP | 1 328 080 | 7/2003 |
|---|---|---|
| GB | 1 328 080 A1 * | 7/2003 |

* cited by examiner

*Primary Examiner*—Joseph Feild
*Assistant Examiner*—Kamran Afshar
(74) *Attorney, Agent, or Firm*—Volpe and Koenig, PC

(57) ABSTRACT

A method for increasing cellular system capacity includes receiving a signal in a time slot and a frequency band and transmitting a signal in the same time slot and the same frequency band. An adaptive self-interference canceller is used to reduce the radio frequency self-interference created by receiving and transmitting signals in the same time slot and the same frequency band. The self-interference can be further reduced by using: (1) a circulator connected between an antenna, a receiver, and a transmitter; (2) separate antennas for receiving and transmitting signals can be used; and/or (3) an adaptive antenna.

11 Claims, 4 Drawing Sheets

SYSTEM AND METHOD FOR INCREASING CELLULAR SYSTEM CAPACITY BY THE USE OF THE SAME FREQUENCY AND TIME SLOT FOR BOTH UPLINK AND DOWNLINK TRANSMISSIONS

CROSS REFERENCE TO RELATED APPLICATIONS

This application claims priority from U.S. Patent Application Ser. No. 60/441,713, filed Jan. 21, 2003, which is incorporated by reference as if fully set forth herein.

FIELD OF INVENTION

The present invention relates generally to radio communication systems and more particularly, relates to increasing uplink and downlink cell capacity using the same frequency and time slot.

BACKGROUND

In third generation (3G) wireless communication systems, particularly in the time division duplex (TDD) mode, the time axis is divided into intervals of equal durations called frames. Cellular systems employing the TDD mode divide frames into a finite number ($N_T$) of intervals of equal duration, called slots, and allow a cell to use some or all of the slots for uplink (mobile-to-base) or downlink (base-to-mobile) transmissions.

The slot assignment of a cell defines how each slot is used by the cell. It is generally understood that there are three possible ways for a cell to use a slot: (1) for uplink transmissions, (2) for downlink transmissions, or (3) not used.

The assignment of slots within a cell can be varied by the system to conform to the long-term variations of offered traffic. For example, the system may modify the assignment of one slot from uplink to downlink if the intensity of offered downlink traffic increases while the offered uplink traffic decreases. In addition, different cells of a system do not generally need to have the same slot assignment. Thus, if offered traffic characteristics in one geographical area are different from another geographical area, the cells covering those areas may have different assignments so as to best adapt to local traffic conditions.

While the capability of varying the assignment of slots within a cell as described in the previous paragraph permits the system to adapt to varying traffic asymmetry conditions by trading downlink capacity for uplink capacity (or vice versa) within a cell, it does not permit the system to adapt very well to geographically inhomogeneous traffic conditions (i.e., it will not allow a cell to simultaneously support more traffic in both directions than its neighbors). This is because a slot in prior art arrangements is not allowed to be used for both uplink and downlink transmissions at the same time. Therefore, the system will fail to handle the following scenarios: (1) where many users are geographically concentrated in the same area; or (2) where there are several users in the same area, requiring high bit rates in both uplink and downlink directions.

To some extent, such scenarios can be handled by a load balancing mechanism whereby some users do not connect to the most favorable cell in terms of path loss, but rather to neighboring cells that are less loaded. However, this approach has limitations in that it requires higher transmission power for users connected to distant cells. This can be a significant problem particularly for high data rate users (i.e., scenario (2) above). As a result, some users in heavily loaded cells cannot be served even though there is spare capacity elsewhere in the system. This is a disadvantage.

It would be desirable to provide a method of increasing the uplink and downlink cell capacity without the disadvantages of the known arrangements.

SUMMARY

The present invention exploits the use of adaptive antennas at wireless transmit/receive units (WTRUs) to allow a cell to use the same frequency and time slot for both its uplink and downlink transmissions. This results in a significant increase in capacity that can be used, for example, in hot spot situations. Additionally, uplink and downlink capacity of the system as a whole can be dramatically increased if adaptive antennas are also used at the base station.

BRIEF DESCRIPTION OF THE DRAWINGS

A more detailed understanding of the invention may be had from the following description of the preferred embodiments, given by way of example and to be understood in conjunction with the accompanying drawings, wherein.

DETAILED DESCRIPTION OF THE PREFERRED EMBODIMENTS

The invention is now described in the context of time division duplex (TDD) transmission, as an example. In the present invention, certain time slots are used for both uplink (UL) and downlink (DL) transmission simultaneously. However, the possibility of using a slot for simultaneous UL and DL requires that important interference problems first have to be addressed.

There are two primary types of interference that may be created when allowing a slot to be used for both uplink and downlink transmissions: (1) self interference whereby the base station transmitter creates interference to its own receiver; and (2) a WTRU's transmitter creates interference to its own receiver or to another WTRU's receiver. A WTRU transmitter would create interference to its own receiver only if it is allowed to transmit and receive on the same slot, which is not mandatory even if the base station transmits and receives on the same slot.

Base Station

The base station self-interference problem must be addressed at two levels. The first level is at the RF (analog) stage of the receiver which is in jeopardy of being saturated by the high-power signal coming from the transmitter. The second level is at the baseband stage, in which the base station's own transmitted signal will find itself at the same frequency as the desired signal in the baseband stage since it has not been completely eliminated and it will return to the antenna after having been subjected to reflections and scattering in the multipath environment.

Figure 1:
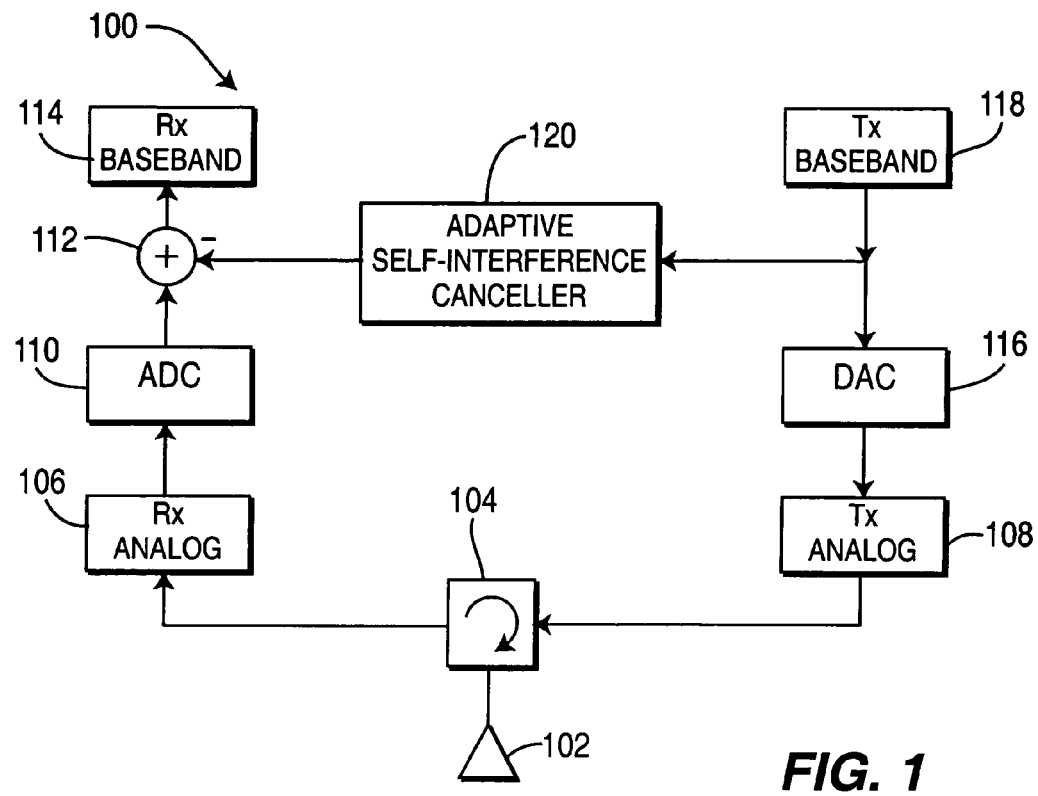
FIG. 1 is a block diagram of a base station constructed in accordance with a first embodiment of the present invention.

FIG. 1 shows a base station 100 constructed in accordance with the present invention. The base station 100 includes an antenna 102 that transmits and receives the electromagnetic signal to and from the environment. A circulator 104 is connected to the antenna 102, to the input of a receiver 106, and to the output of a transmitter 108. The receiver 106 is connected to an analog-to-digital converter (ADC) 110, which converts the received analog signal into a digital signal. An adder 112 is connected to the ADC 110 and is used in connection with an adaptive self-interference canceller 120, as will be described in connection with FIG. 5 below. A receive baseband module 114 decodes the desired received signal. The transmitter 108 receives the output of a digital-to-analog converter (DAC) 116 which processes a digital signal received from a transmit baseband module 118.

The circulator 104 provides isolation from the transmitter 108 to the receiver 106, but will let the signal flow from the transmitter 108 to the antenna 102 and from the antenna 102 to the receiver 106. The isolation provided by the circulator 104 is limited in practice to around 30 dB, and that implies two things.

First, the sensitivity of the signal power of the receiver 106 and/or the transmitter 108 may need to be reduced to avoid non-linear behavior of the receiver front-end under the attenuated transmitted signal. The front-end of the receiver 106 includes non-linear components, such as amplifiers or mixers, which may generate significant undesired signals at their output when they are subject to signals of high amplitude. In order to avoid this, it may be necessary to insert an attenuator at the input of a non-linear component to limit the amplitude of the signal. However, this has the effect of reducing the sensitivity of the receiver 106.

Second, the attenuated transmitted signal needs to be further eliminated in the baseband stage. Since the transmitted and received signals are at the same frequency, this cancellation needs to be performed in the digital domain. When two signals occupy different frequency bands, it is possible to separate one from another by using analog filters that suppress the signal in a certain frequency range, depending on the type of filter. When both desired and undesired signals occupy the same frequency band, this technique cannot be used. Instead, one can attempt to cancel the undesired signal by reconstructing it and subtracting it from the received signal. This subtraction can be done in the digital domain, i.e., after the signal has been sampled and quantized.

Figure 2:
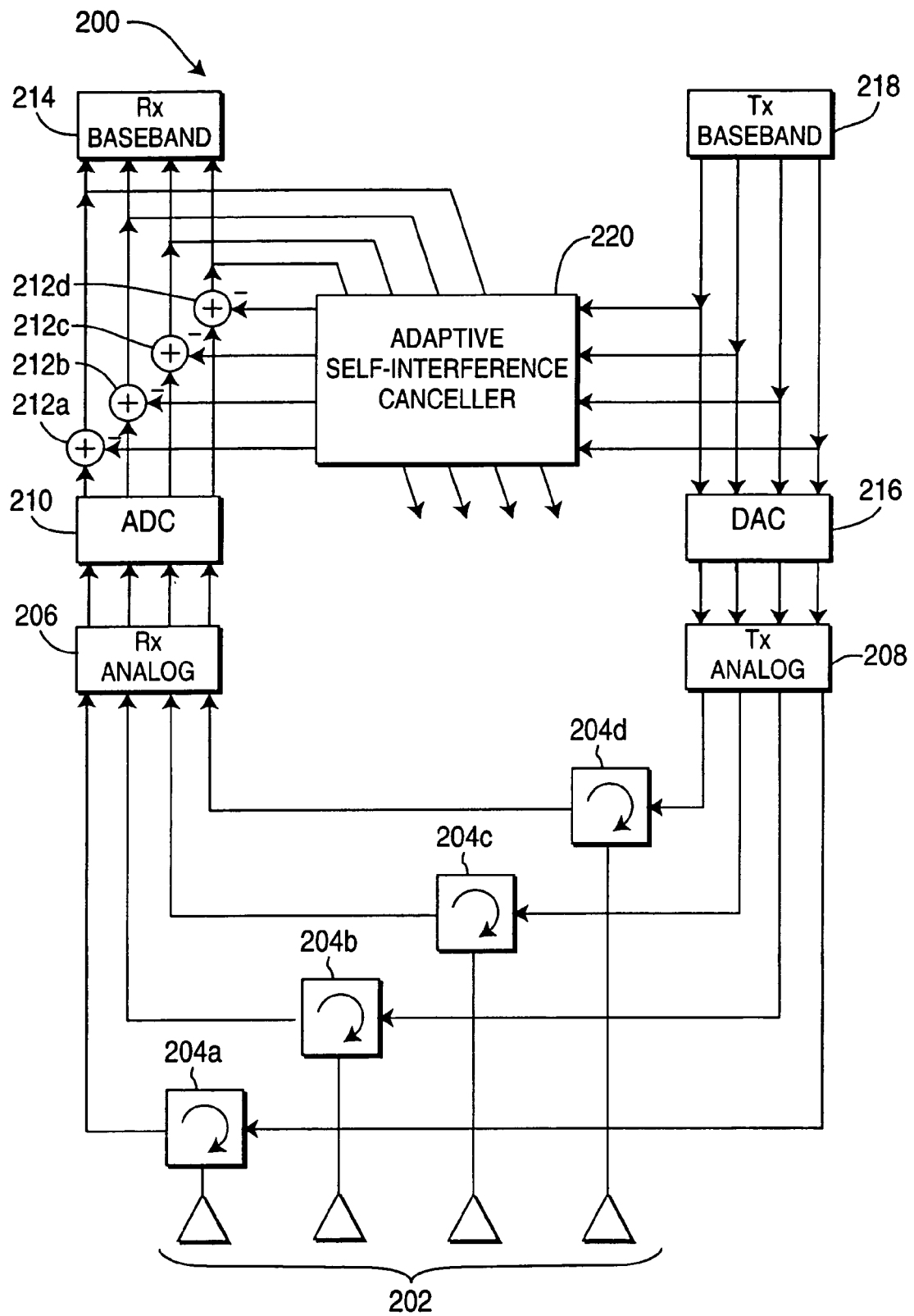
FIG. 2 is a block diagram of an alternate embodiment of the base station shown in FIG. 1.

FIG. 2 shows an alternate embodiment of the base station 100 shown in FIG. 1. For facilitation of discussion, elements shown in FIG. 2 that correspond to elements shown in FIG. 1 have been given like reference numerals, increased by one hundred.

A base station 200 includes an antenna array 202, each of the antennas in the array 202 being used to both transmit and receive signals. Each antenna in the array 202 is connected to a corresponding circulator 204a–204d. The circulators 204a–204d are connected to the input of a receiver 206 and the output of a transmitter 208. The receiver 206 is connected to an ADC 210, which converts the received analog signals into digital signals. A set of adders 212a–212d, each adder 212 corresponding to one antenna in the array 202, are connected to the ADC 210 and are used in connection with an adaptive self-interference canceller 220, as will be described in connection with FIG. 5 below. A receive baseband module 214 decodes the desired received signal. The transmitter 208 receives the output of a DAC 216 which processes a digital signal received from a transmit baseband module 218. While the base station 200 has been shown having an antenna array 202 with four antennas, four circulators 204a–204d, and four adders 212a–212d, it is to be understood that the base station 200 can be constructed with any number of antennas, circulators, and adders, provided that there is a one-to-one correspondence between the antennas, circulators, and adders.

Figure 3:
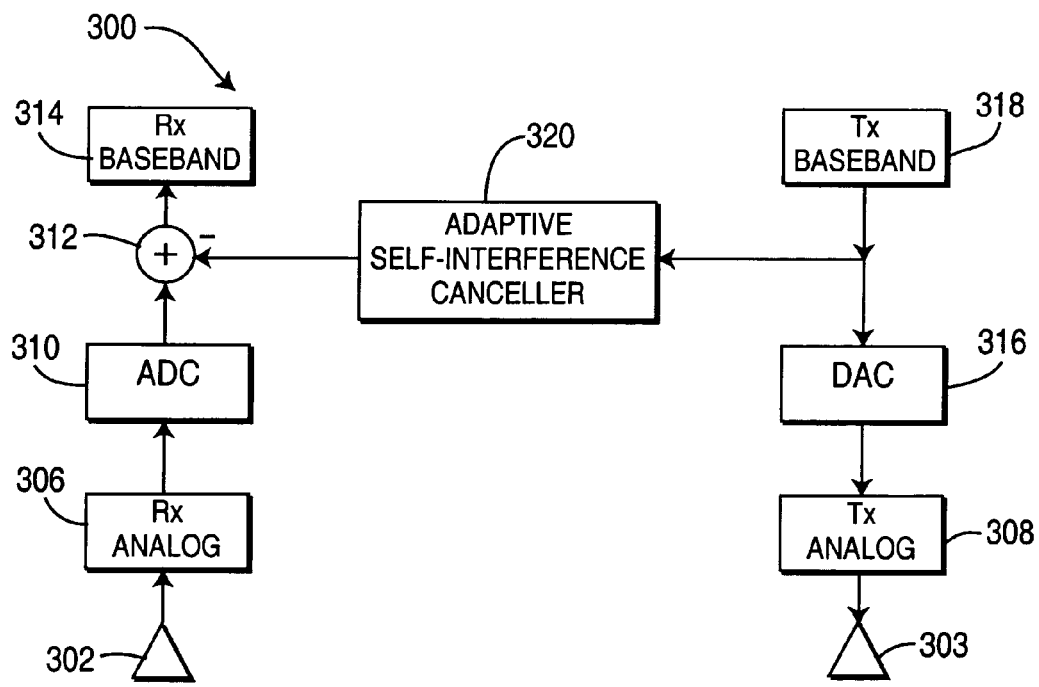
FIG. 3 is a block diagram of a base station constructed in accordance with a second embodiment of the present invention.

Alternatively, as shown in FIG. 3, a base station 300 can use two antennas 302, 303, one for receiving and one for transmitting. The antenna 302 is used for receiving signals and is connected to a receiver 306. The receiver 306 is connected to an ADC 310, which converts the received analog signal into a digital signal. An adder 312 is connected to the ADC 310 and is used in connection with an adaptive self-interference canceller 320, as will be described in connection receive baseband module 314 decodes the desired received signal. The antenna 303 is used for transmitting signals and is connected to a transmitter 308. The transmitter 308 receives the output of a DAC 316 which processes a digital signal received from a transmit baseband module 318.

Spatial separation between the antennas 302, 303 provides isolation between the receiver 306 and the transmitter 308. The isolation provided by using separate antennas 302, 303 could be between 30 dB and 70 dB, depending on the physical configuration of the antennas. This limited isolation implies the same two issues as discussed above in connection with the circulator 104 (i.e., the non-linearity of the receiver and broadband elimination of interfering signals).

Figure 4:
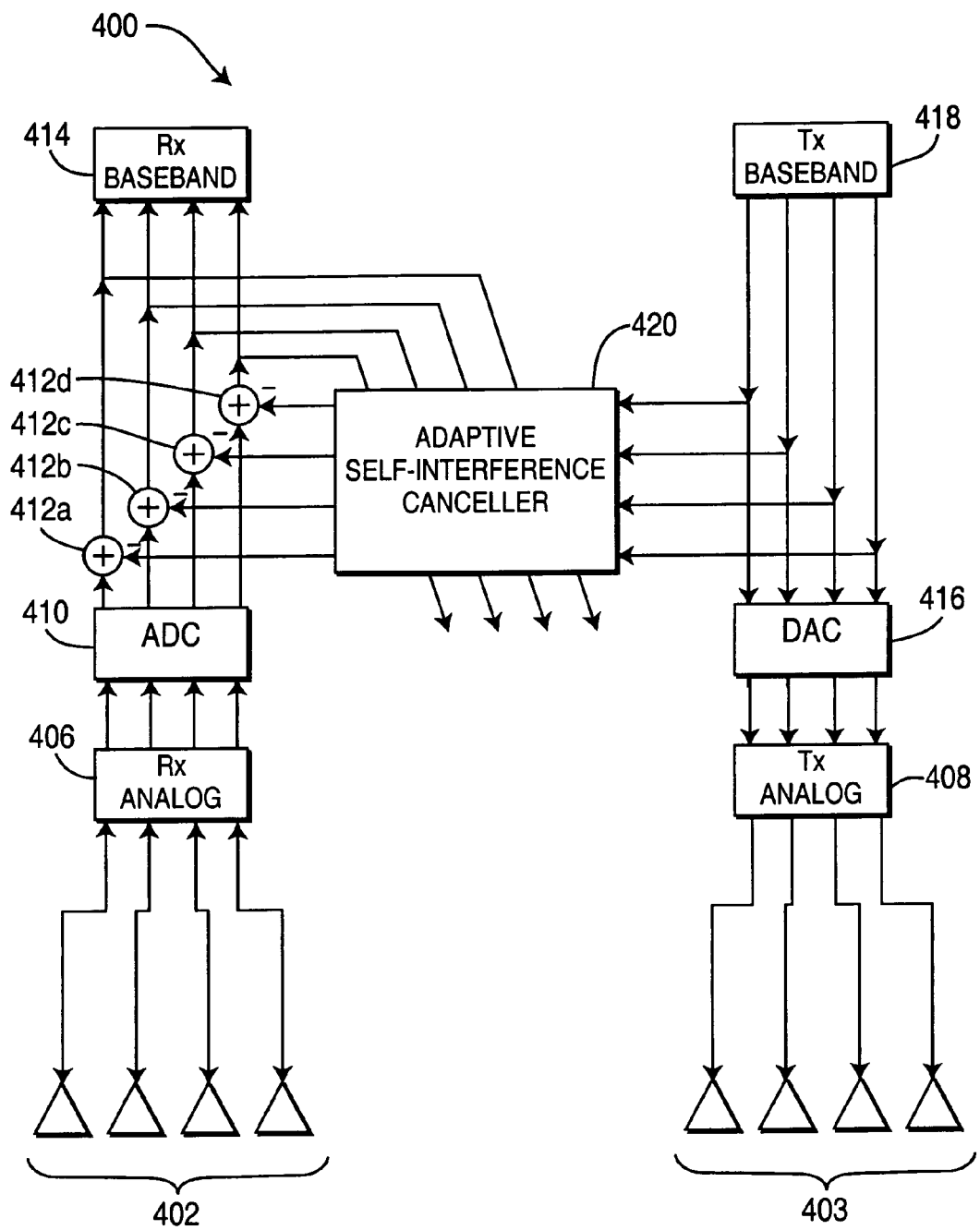
FIG. 4 is a block diagram of an alternate embodiment of the base station shown in FIG. 3.

FIG. 4 shows an alternate embodiment of the base station 300 shown in FIG. 3. For facilitation of discussion, elements shown in FIG. 4 that correspond to elements shown in FIG. 3 have been given like reference numerals, increased by one hundred.

A base station 400 has two antenna arrays 402, 403, one for transmitting and one for receiving. The antenna array 402 is used for receiving signals and each of the antennas in the array 402 is connected to a receiver 406. The receiver 406 is connected to an ADC 410, which converts the received analog signals into digital signals. A set of adders 412a–412d, each adder 412 corresponding to one antenna in the array 402, are connected to the ADC 410 and are used in connection with an adaptive self-interference canceller 420, as will be described in connection with FIG. 5 below. A receive baseband module 414 decodes the desired received signals. The antenna array 403 is used for transmitting signals and each of the antennas in the array 403 is connected to a transmitter 408. The transmitter 408 receives the output of a DAC 416 which processes the digital signals received from a transmit baseband module 418.

Figure 5:
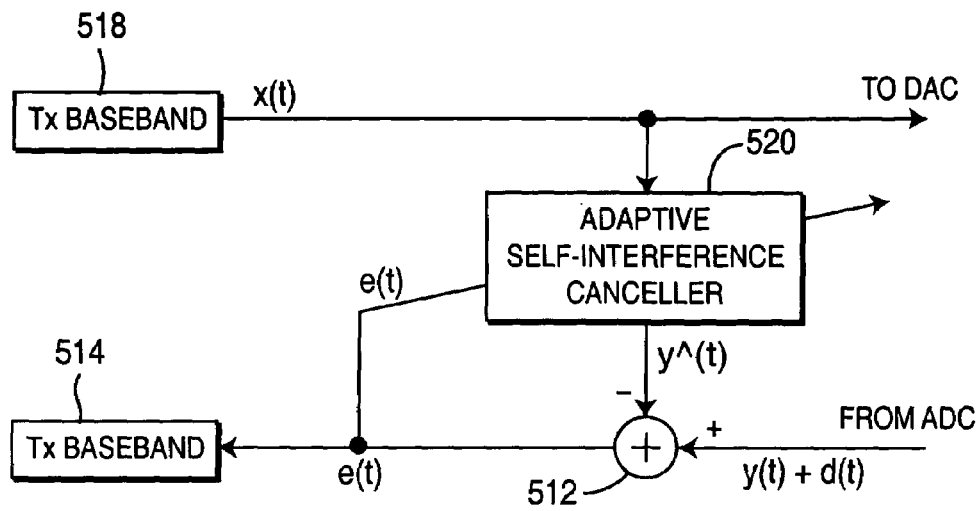
FIG. 5 is a block diagram showing the operation of the adaptive self-interference canceller shown in FIGS. 1–4.

FIG. 5 is an enlarged block diagram illustrating the function of the adaptive self-interference canceller shown in FIGS. 1–4. For facilitation of discussion, elements shown in FIG. 5 that correspond to elements shown in FIGS. 1–4 have been given like reference numerals, with the difference being in the hundreds place.

Referring now to FIG. 5, an adaptive self-interference canceller 520 subtracts the self-interference from the rest of the received signal. The canceller 520 functions as an adaptive filter. Let x(t) be the signal generated by a transmit baseband module 518, and let r(t) be the signal received at the input of a receive baseband module 514 after processing by the ADC (not shown in FIG. 5). The received signal r(t) can be written as the sum of two signals, y(t) and d(t), where y(t) is the self-interference consisting of the echoes of x(t) from the multipath environment as well as its incomplete attenuation through the circulator (not shown in FIG. 5), and d(t) is the desired received signal from the WTRUs. The output of the canceller 520, ŷ(t), is the estimation of the self-interference y(t) and is subtracted from the received signal r(t) by an adder 512. The result of this subtraction, e(t), consists of the estimated desired received signal and is sent to the receive baseband module 514 for decoding. The signal e(t) is also used as a control signal for the canceller 520, allowing it to track variations of the multipath environment induced by the movement of objects. Internally, the canceller 520 can be implemented as a linear finite-impulse response (FIR) filter. The weights of this filter can be computed as a function of the input signal (x(t)) and the control signal (e(t)) using any state-of-the-art algorithm applying to linear filters, such as Recursive Least Squares (RLS).

Wireless Transmit/Receive Unit (WTRU)

With respect to the interference problems experienced by the WTRU, the solution depends on whether the WTRU is allowed to transmit in the same slot within which it is receiving. There are two possibilities for the design of WTRUs when the base station is using the system of the present invention.

The first possibility is that the WTRUs are not allowed to transmit and receive simultaneously in the same slot. This does not prohibit use of the present invention at the base station, because the base station can serve several WTRUs in a given time slot. When the base station is allowed to transmit and receive simultaneously at the same frequency, it is not required that the transmission and the reception are for the same WTRU. For example, in a given time slot S1, the base station can transmit to WTRU A while receiving from WTRU B. In other words, S1 accommodates the downlink of WTRU A and the uplink of WTRU B. The uplink of WTRU A and the downlink of WTRU B can be accommodated in a different time slot, for example, S2.

The second possibility is that the WTRUs are allowed to transmit and receive in the same time slot. This presents the advantage of higher flexibility in terms of assigning WTRUs to time slots, since the WTRUs are not constrained to use different slots for their uplink and downlink transmissions. However, this possibility results in higher complexity and higher cost for the WTRUs, since the WTRUs need the adaptive self-interference canceller and the circulator.

Regardless of which of these two possibilities is adopted, the WTRUs need to use adaptive antennas in order to mitigate the interference coming from other WTRUs transmitting in the same slot that they are receiving in. Even if the WTRU transmits and receives in the same time slot, e.g., S3, this does not exclude another WTRU from transmitting in time slot S3 because the base station is allowed to receive signals from more than one WTRU in a given time slot, as in prior art systems.

One embodiment of a WTRU constructed in accordance with the present invention is similar to that shown and described above in connection with FIG. 2. The use and function of each element is the same as in the case of the base station, with one signal path existing for each antenna in the array 202. The setting of the weights applied to each array element is performed at the receive baseband module 214 and the transmit baseband module 218. Thus, the architecture supports digital beamforming. The adaptive self-interference canceller 220 is required only if the WTRU is permitted to transmit and receive in the same slot.

Adaptive Antennas

Figure 6:
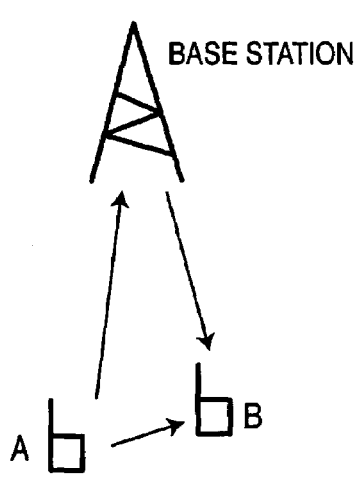
FIG. 6 shows the interference between two mobile units using the same slot in opposite directions.

Referring to FIG. 6, the WTRU A may create interference to WTRU B geographically located in the vicinity of WTRU A if WTRU B is using the transmit slot of WTRU A as its receive slot. Generally, WTRU B can escape (i.e., switch) to another slot for its receptions. However, when the traffic load in the cell becomes high, attempting to escape to a new time slot may be insufficient since there is a high probability that this new slot is occupied by another WTRU that is also sufficiently close to WTRU B to cause intolerable interference. However, in accordance with the present invention, WTRUs are equipped with adaptive antennas to overcome this problem.

Figure 7:
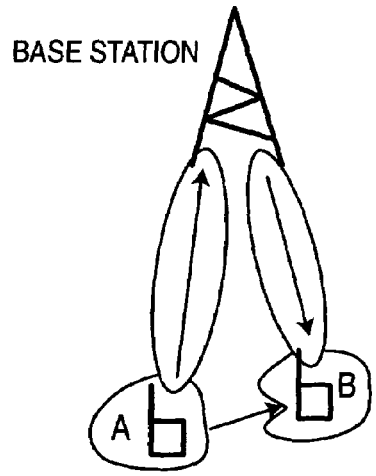
FIG. 7 shows mitigation of interference between two mobile units using adaptive antennas.

Referring now to FIG. 7, the adaptive antenna pattern of WTRU A is steered towards its serving base station or in the direction most favorable to adequate reception at the base station, thereby decreasing the probability that significant interference is sent to WTRU B. Likewise, the adaptive antenna pattern of WTRU B is steered towards its serving base station so as to obtain the best possible reception. In addition, WTRU B has the capability of setting a null in the direction where interference is the greatest, presumably from WTRU A.

In general, adaptive antennas, which are constructed as an array of antenna elements, enhance the reception of the desired signal while suppressing the interfering signals, by exploiting the fact that the desired signals and the interfering signals often come from dominant directions. By properly weighting and combining the signals of each array element, it is possible to enhance the signals received from/transmitted to certain directions, while suppressing the signals received from/transmitted to other directions.

The weighting adjustments are performed by adaptive algorithms in the transmit baseband and receive baseband modules that exploit certain characteristics of the desired and/or interfering signals to differentiate them; for example, a known sequence of symbols. For one example in the current setting, the system could use the midambles of the desired and main interfering signals to help determine the optimal weight adjustment resulting in the best possible signal-to-interference ratio.

The concept of using adaptive antennas is novel in the current setting. The adaptive antenna deployed at WTRU B, as shown in FIG. 7, serves primarily to reduce the interference produced by other WTRUs operating in the same cell or in neighboring cells, and transmitting in the same time slot that WTRU B uses for receiving.

In prior art cellular systems employing adaptive antennas, the adaptive antennas would be used to improve system performance by the following mechanisms: (1) when deployed at a base station, by reducing the interference produced by the transmissions of WTRUs other than the desired WTRU while enhancing the signal from the desired WTRU; and (2) when deployed at a WTRU, by reducing the interference produced by the transmissions of base stations other than the serving base station while enhancing the signal from the serving base station. In conventional TDD systems, where uplink and downlink transmissions are sent in different time slots in a cell, adaptive antennas at WTRU A could also be used to reduce the interference from other WTRUs if the other WTRUs transmit in the same time slot as the one used by WTRU A for receiving, but the other WTRUs could only be situated in other cells of the system.

Still referring to FIG. 7, the transmission patterns of WTRUs A and B are shown. Although there may still be cases where two specific WTRUs cannot co-exist on the same slot (such as, for example, if they are aligned together with the base station), it should be clear that the probability of successful escape to another slot is greatly improved when adaptive antennas are used at the WTRUs.

In an alternative embodiment of the present invention, the maximum benefit is achieved when the base station is also equipped with adaptive antennas. It is not mandatory that all WTRUs in the system be equipped with adaptive antennas. The system could reserve a subset of the available time slots for these WTRUs, and in this subset of time slots, simultaneous transmission and reception at the base stations would not be allowed. When a base station uses an omni-directional or wide-beam antenna as in the prior art, it is generally not possible for a neighboring cell to use the same slot in any direction due to the resulting interference between base stations.

Figure 8:
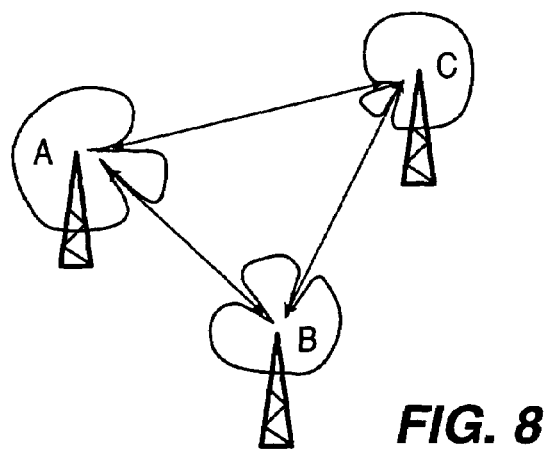
FIG. 8 shows mitigation of interference between three base stations using adaptive antennas.

In contrast, equipping the base station with adaptive antennas in accordance with the present invention permits neighboring cells to use the same slot for both uplink and downlink directions, potentially resulting in a doubling of the capacity of the system in both directions. Referring now to FIG. 8, base stations A, B, and C set nulls in the direction of each other through their respective adaptive antennas, so as to minimize their mutual interference. The architecture of a base station using adaptive antennas could be the same as that shown in FIG. 2. Alternatively, the base station could use two separate antenna arrays for transmission and reception as shown in FIG. 4.

One drawback with this null-setting scheme is that the base station antenna pattern can potentially degrade the coverage in certain regions, particularly along the axis joining two neighboring base stations. As such, it may be necessary that some slots not be subject to use in both directions so that the base stations do not need to set nulls in their patterns in those slots. This can easily be accomplished since antenna patterns can be easily adapted from one slot to the next. This would allow users lying in the regions along the lines joining base stations to be adequately served. Switching the antenna pattern can be performed instantly if the antenna elements weights are applied in the baseband section of the transmitter or receiver (digital beamforming). In that case, changing the antenna pattern from one time slot to the next does not present a problem.

Another possibility resulting from the use of adaptive antennas at the base station is to allow the same physical channel (defined as a timeslot and a spreading code) to be used by more than one user in the same cell. Such a scheme is often referred to as "spatial division multiple access" (SDMA) in the art. SDMA is another access scheme that can provide a substantial capacity benefit. Using SDMA is possible as long as the users are well "angularly" separated, and is also compatible with the other schemes presented in or applicable to this specification, provided that the beam of a base station using a slot for transmitting is not pointed towards a neighboring base station using the same slot for receiving, or vice-versa. This may require the user to escape to a slot that is not used in both directions when it is moving to a critical region.

The foregoing description of the preferred exemplary embodiments of the present invention is described in connection with a TDD system, but is equally applicable to other situations such as, for example, frequency-division multiplexing and code division multiple access with some variations where selected time slots can be used for simultaneous uplink and downlink use, and where the consequent interference problems can be addressed. All such variations and modifications are intended to be within the scope of the present invention.

What is claimed is:

1. A method for increasing cellular system capacity, comprising the steps of:
   receiving a signal in a time slot in a frequency band;
   transmitting a signal simultaneously with said received signal in the same time slot and frequency band;
   using an adaptive self-interference canceller to reduce the radio frequency self-interference created by receiving and transmitting signals in the time slot; and
   using a circulator, the circulator being connected between an antenna, a receiver, and a transmitter.

2. The method according to claim 1, wherein the circulator acts to reduce radio frequency self-interference by isolating the signal flow between the antenna and the receiver or between the transmitter and the antenna.

3. The method according to claim 1, further comprising the step of using separate antennas for receiving and transmitting.

4. The method according to claim 1, further comprising the step of using an adaptive antenna.

5. The method according to claim 1, wherein the canceller acts to reduce baseband self-interference by subtracting the self-interference from the rest of a received signal.

6. A system for increasing cellular system capacity, comprising:
   an antenna;
   a receiver section connected to said antenna, said receiver section receiving a signal;
   a transmitter section connected to said antenna, said transmitter section transmitting a signal;
   an adaptive self-interference canceller connected between said receiver section and said transmitter section, said adaptive self-interference canceller reducing radio frequency self-interference created when said receiver section receives a signal and said transmitter section simultaneously transmits a signal in the same time slot and the same frequency band; and
   a circulator connected between said antenna, said receiver section, and said transmitter section.

7. The system according to claim 6, wherein said antenna comprises an adaptive antenna.

8. The system according to claim 6, wherein said antenna comprises a single antenna for receiving and transmitting signals.

9. The system according to claim 6, wherein said antenna comprises an antenna array for receiving and transmitting signals.

10. The system according to claim 6, wherein said antenna comprises a first antenna for receiving signals and a second antenna for transmitting signals.

11. The system according to claim 6, wherein said antenna comprises a first antenna array for receiving signals and a second antenna array for transmitting signals.

* * * * *

UNITED STATES PATENT AND TRADEMARK OFFICE
CERTIFICATE OF CORRECTION

PATENT NO. : 7,096,042 B2  Page 1 of 1
APPLICATION NO. : 10/624812
DATED : August 22, 2006
INVENTOR(S) : Paul Marinier It is certified that error appears in the above-identified patent and that said Letters Patent is hereby corrected as shown below:

IN THE SPECIFICATION

At column 4, line 23, after the word "connection", insert --with FIG. 5 below. A--

Signed and Sealed this

Twentieth Day of March, 2007

JON W. DUDAS
*Director of the United States Patent and Trademark Office*